United States Patent [19]
Schmitz

[11] Patent Number: 5,889,476
[45] Date of Patent: Mar. 30, 1999

[54] METHOD OF REDUCING THE SPEED OF A VEHICLE HAVING A COLLISION AVOIDANCE SYSTEM

[75] Inventor: Günter Schmitz, Aachen, Germany

[73] Assignee: FEV Motorentechnik GmbH & Co. KG, Aachen, Germany

[21] Appl. No.: 764,753

[22] Filed: Dec. 12, 1996

[30] Foreign Application Priority Data

Dec. 14, 1995 [DE] Germany ............... 195 46 652.7

[51] Int. Cl.⁶ ................................................ G08G 1/16
[52] U.S. Cl. ................ 340/903; 340/904; 340/435; 340/436; 180/169; 180/271; 367/909; 701/301
[58] Field of Search ............................ 340/903, 904, 340/935, 936; 767/909; 180/169, 170, 167, 271, 272; 701/301

[56] References Cited

U.S. PATENT DOCUMENTS

| | | | |
|---|---|---|---|
| 4,628,317 | 12/1986 | Nishikawa et al. | 340/903 |
| 5,314,037 | 5/1994 | Shaw et al. | 340/903 |
| 5,355,118 | 10/1994 | Fukuhara | 340/903 |
| 5,629,669 | 5/1997 | Asano et al. | 340/903 |
| 5,659,304 | 8/1997 | Chakraborty | 340/903 |
| 5,670,953 | 9/1997 | Satoh et al. | 340/903 |

*Primary Examiner*—Edward Lefkowitz
*Attorney, Agent, or Firm*—Venable; Gabor J. Kelemen

[57] ABSTRACT

A method of reducing the travelling speed of a vehicle which has a multi-cylinder, piston-type internal-combustion engine, a variably controllable valve drive and a collision avoidance system includes the following steps: continuously determining, by the collision avoidance system, an actual distance between the vehicle and a vehicle ahead and comparing the actual distance with a speed-dependent minimum safe distance; and braking the vehicle by switching over at least one of the engine cylinders to a compressor operation when the actual distance falls below a minimum safe distance.

8 Claims, 1 Drawing Sheet

METHOD OF REDUCING THE SPEED OF A VEHICLE HAVING A COLLISION AVOIDANCE SYSTEM

CROSS REFERENCE TO RELATED APPLICATION

This application claims the priority of German Application No. 195 46 652.7 filed Dec. 14, 1995, which is incorporated herein by reference.

BACKGROUND OF THE INVENTION

For increasing the safety in motor vehicle traffic, collision avoidance systems have been developed which have a transmitter/receiver system that continuously scans the space in front of the vehicle as viewed in the driving direction for detecting vehicles ahead. If another vehicle is located within a predetermined distance range in front of the vehicle, then the distance between the two vehicles is detected and, as a function of the following vehicle, a minimum distance is determined that must be maintained. If the actual distance falls below the predetermined minimum distance, the collision avoidance system triggers a signal which acts upon the brake system and causes a braking operation independently from the driver.

It is a disadvantage of the above-outlined system that in case the system makes an erroneous decision, the driver is not able to intervene and make corrections, thus resulting in a high safety risk. Another disadvantage lies in the considerably higher costs for the braking system itself, for example an ABS system, because provisions must be made to apply a driver-independent force in addition to the regular brake actuation.

SUMMARY OF THE INVENTION

It is an object of the invention to provide an improved collision-avoidance method of the above-outlined type, from which the discussed disadvantages are eliminated.

This object and others to become apparent as the specification progresses, are accomplished by the invention, according to which, briefly stated, the method of reducing the travelling speed of a vehicle which has a multi-cylinder, piston-type internal-combustion engine, a variably controllable valve drive and a collision avoidance system includes the following steps: continuously determining, by the collision avoidance system, an actual distance between the vehicle and a vehicle ahead and comparing the actual distance with a speed-dependent minimum safe distance; and braking the vehicle by switching over at least one of the engine cylinders to a compressor operation when the actual distance falls below a minimum safe distance.

Since in multicylinder piston-type internal combustion engines having variably controllable valve drives the valve drive actuation is designed such that the engine may be switched to compressor operation, it is possible to generate a braking torque by the engine independently of the braking system. In case of erroneous decisions by the system, such a possibility provides the option of stopping the braking operation which, depending on the vehicle equipment or design of the individual control systems may be effected by the driver's action, for example by actuating the clutch pedal, by touching the brake pedal or by changing the position of the accelerator pedal.

The method according to the invention has particular advantages in case of valves of a piston-type internal combustion engine in connection with fully variable valve drives, such as can be realized with electromagnetic valve actuators. An electromagnetic valve drive has an armature which is connected to the valve to be actuated and which can be moved back and forth into open and closed positions between two controllable electromagnets. Thus, by an appropriate actuation of the electromagnet not only the valve opening and closing times may be controlled in accordance with the operating requirements preset by the engine control, but it is also possible to actuate the valves via the engine control, independently from the normal operating cycle. Such an operation also permits switching the piston-type internal combustion engine to compressor operation by turning off the fuel supply, selectively starting with only one cylinder and continuing until all cylinders are affected. This means that the intake air is initially compressed, but can then prematurely flow out from the combustion chamber. Consequently, in case of a standard four-cycle engine, this results in a switching to a two-cycle compressor operation since the control is fully variable. Thus, depending on the desired braking power, the valves can be opened sooner or later by means of the valve drive control. The selection of the switching moments too, can be effected as a function of the rpm, so that even for low rpm's, the valves can be moved within short crank angle intervals from a fully closed to a fully open position and thus the discharge and inflow of the medium takes place during very short crank angle intervals.

It is another advantage of the method according to the invention, especially when practiced in connection with electromagnetic valve drives that apart from a varying number of cylinders switchable to compressor operation in case of actuation, any optional braking torque up to a maximum braking torque can be generated by continuously adjusting the control times. Such an operation is, first, important for a correct "dosing" of the braking to avoid a collision, and second, it assists in providing for smooth transitions in the vehicle deceleration to thus avoid startling or annoying the driver.

According to an advantageous feature of the method, in particular when practiced in connection with variably controllable valve drives of a piston-type internal combustion engine, a setting of the vehicle speed is effected by a steplessly adjustable gear and the gear transmission ratio is reduced by the collision avoidance system in case of a forced braking. By varying the gear transmission ratio, particularly in the sense of reducing the ratio, the possibility is provided, first, to increase the value for the maximum possible braking torque and second, to reduce the gear ratio within a time interval, so that the driver is not startled or annoyed by an abrupt introduction of the braking torque. Expediently, the smallest possible gear ratio is limited by the predetermined maximum engine rpm. This ensures that the maximum engine rpm cannot be exceeded even if the maximum possible braking moment is demanded. This feature of the invention furthermore permits the brief application of a high braking torque by means of a rapid adjustment of the gear in the sense of reducing the gear ratio, because in such a case the engine too, is accelerated and supports the braking of the vehicle by its moment of inertia.

According to an advantageous feature of the invention the above-described two methods are combined, wherein the actuation of the valve drive and/or the actuation of the steplessly adjustable drive is effected as a function of the speed with which the distance from the preceding vehicle is reduced. This provides the possibility of presetting the increase and the maximum value for the braking moment to be introduced by the collision avoidance system through selecting a facultative or cumulative actuation of both "braking systems." This makes a combination of both methods particularly effective.

If, however, the maximum available drive line braking torque should not be sufficient, a conventional forced braking by acting upon the vehicle braking system via the collision avoidance system may be provided. However, owing to the initially described risks as a result of failure, this should be avoided if possible.

DESCRIPTION OF THE PREFERRED EMBODIMENT

Figure 1:
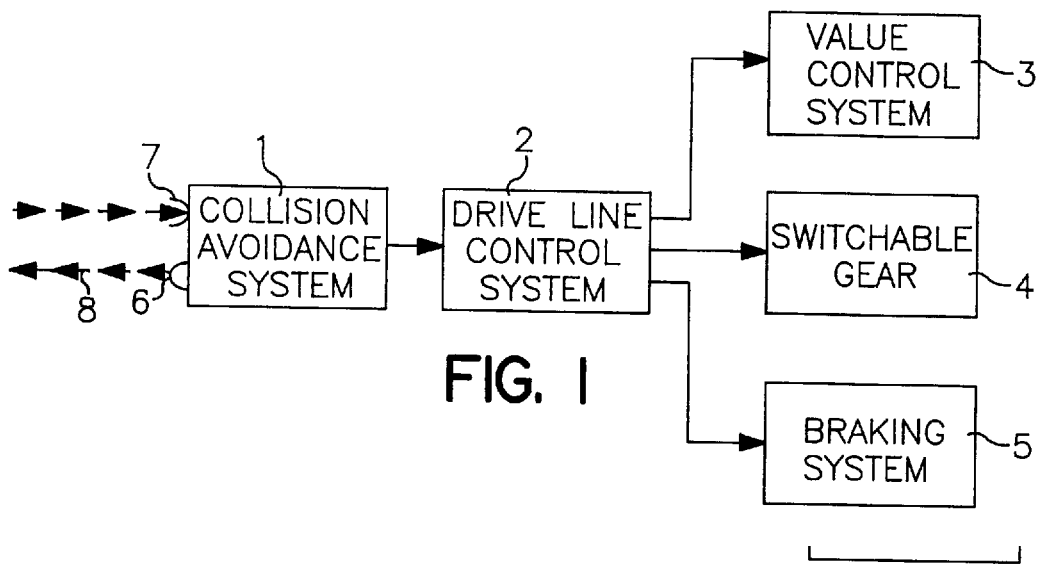
FIG. 1 is a block diagram illustrating a preferred embodiment of the method according to the invention.

FIG. 1 shows a collision avoidance system 1 connected to a drive line control system 2 which, in turn, is coupled to a valve control 3 system and a fully variable and also switchable gear 4. Further, the drive line control system 2 is also connected to a braking system 5 that can be activated directly, that is, independently of the driver.

The collision avoidance system 1 is provided with a transmitter 6 and a receiver 7. If a measuring beam 8 emitted by the transmitter 6 in the driving direction of the vehicle is reflected by the surface of a preceding vehicle and is detected by the receiver 7, the collision avoidance system 1 determines the distance between the two vehicles. If the measuring beam 8 is emitted intermittently at short intervals, then the change in the distance over time can also be determined. By superimposing the driving speed of the vehicle on its collision avoidance system 1, the latter may determine when the respective devices for a forced braking must be activated (for example, when the actual distance between the two vehicles falls below a predetermined minimum value), and may also determine, from the speed with which the distance decreases, how large the forcibly induced braking torque should be.

Based on the values predetermined by, the collision avoidance system 1, the drive line control system 2 can determine whether the variable valve control 3 or the steplessly adjustable gear 4 or both must be actuated.

For a vehicle with a driver-operated braking system 5 (for example, an ABS-system) the possibility is provided to influence the ABS-operation of the braking system via the drive line control system 2 either facultatively or cumulatively with one of the other two braking systems in the drive line.

The valve control 3 is used preferably in connection with electromagnetic valve drives which are fully variable and therefore offer clear advantages over other variable valve actuations. The method according to the invention, however, can also be used with any valve drive for which the control times can be changed freely within set limits in order to generate a still sufficiently high negative engine torque.

Figure 2:
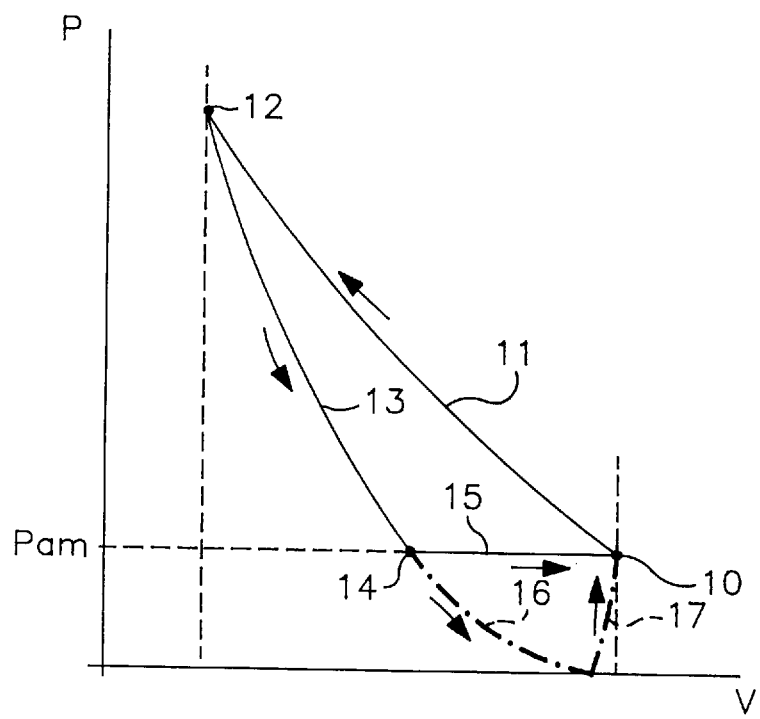
FIG. 2 is a pressure/volume diagram for a cylinder of a piston-type internal combustion engine.

FIG. 2 shows a pressure/volume diagram for an engine cylinder to illustrate the method when a variable valve drive is used. The direction in which the diagram is to be read is indicated by respective arrows drawn at the individual curve segments. If the piston of the cylinder is at the lower dead center 10., then the largest combustion chamber volume is reached. In such a phase the combustion chamber contains an essentially gaseous medium, for example air or exhaust gas, under ambient (atmospheric) pressure $P_{am}$. If all valves are closed, then the gas is compressed as the chamber volume decreases in response to the upward movement of the piston, and thus the pressure rises as shown by the curve segment 11. As soon as the piston reaches the upper dead center 12, at least one of the cylinder valves is opened, so that the air can escape from the combustion chamber and the pressure can decrease very quickly, as indicated by the curve segment 13. As soon as the ambient pressure $P_{am}$ is reached (point 14), either again a gas inflow occurs (curve segment 15) or all valves are closed to generate a "negative pressure" (curve segment 16). When generating a negative pressure, at least one of the valves can be opened again near the lower dead center 10 to permit medium to again enter the cylinder (curve segment 17). If the piston-type internal combustion engine has fully variable valve drives, for example, electromagnetically operated valve drives, the sequence described above can start again immediately because full variability means that the control does not depend on the four-cycle method, but that the above-described compressor operation can be carried out in a two-cycle method.

It is seen that the contour integral PdV is negative, that is, the area of the P/V diagram is enclosed counterclockwise. The larger this area, the higher the work derived from the piston or the crank drive. Depending on the desired braking power, the valves can be opened sooner or later as actuated by the collision avoidance system 1 and the drive line control system 2. The switching moments too, may be selected as a function of speed. Thus, an actuation system may be suitable that permits a "moving along" of the curve segments 16 and 17, in particular also for low rpm's, because the valves in that case can be changed from a fully closed position to a fully opened position within short crank angle intervals, so that the inflow and outflow of the medium also takes place within very small crank angle intervals.

As can be seen in FIG. 2, a continuous adjustment of the control time permits the generation of any optional braking torque up to the maximum braking torque. This can be effected either by the actuation of an individual cylinder or, with a respective increase in the braking torque, by a successive switching of individual and/or multiple cylinders from the driving operation to the compressor operation.

It will be understood that the above description of the present invention is susceptible to various modifications, changes and adaptations, and the same are intended to be comprehended within the meaning and range of equivalents of the appended claims.

What is claimed is:

1. A method of reducing the travelling speed of a vehicle, comprising the following steps:
    (a) providing the vehicle with a multi-cylinder, piston-type internal-combustion engine;
    (b) providing the engine with a fully variably controllable valve drive;
    (c) providing the vehicle with a collision avoidance system;
    (d) continuously determining, by the collision avoidance system, an actual distance between the vehicle and a vehicle ahead and comparing the actual distance with a speed-dependent minimum safe distance;
    (e) braking the vehicle by switching over at least one of the engine cylinders to a compressor operation when the actual distance falls below said minimum safe distance; and
    (f) controlling said valve drive of said cylinder and controlling the quantity of cylinders operating as a compressor as a function of the speed at which the actual distance is reduced.

2. The method as defined in claim 1, wherein step (a) comprises the step of providing a four-cycle engine and further wherein step (e) comprises the step of switching over to a two-cycle compressor operation.

3. The method as defined in claim 1, further comprising the steps of providing a steplessly variable gear having a transmission ratio for setting the travelling speed of the vehicle and reducing said transmission ratio when said collision avoidance system effects a forced braking.

4. The method as defined in claim 3, wherein the step of reducing said transmission ratio includes the step of limiting a reduction of said transmission ratio by a predetermined maximum rpm of the engine.

5. The method as defined in claim 3, further comprising the step of controlling said steplessly variable gear as a function of the speed at which the actual distance is reduced.

6. The method as defined in claim 1, wherein a control for a forced braking is switched off by the driver by actuating said valve drive.

7. The method as defined in claim 3, wherein a control for a forced braking is switched off by the driver by actuating said steplessly variable gear.

8. A method of reducing the travelling speed of a vehicle, comprising the following steps:
   (a) providing the vehicle with a multi-cylinder, piston-type internal-combustion engine;
   (b) providing the engine with a fully variably controllable valve drive;
   (c) providing the vehicle with a collision avoidance system;
   (d) continuously determining, by the collision avoidance system, an actual distance between the vehicle and a vehicle ahead and comparing the actual distance with a speed-dependent minimum safe distance;
   (e) providing the vehicle with a steplessly variable gear having a transmission ratio for setting the travelling speed of the vehicle;
   (f) forcibly braking the vehicle by the collision avoidance system when the actual distance falls below said minimum safe distance;
   (g) controlling said valve drive of said cylinder and controlling the quantity of cylinders operating as a compressor as a function of the speed at which the actual distance is reduced; and
   (h) reducing said transmission ratio when said collision avoidance system effects a forced braking.

* * * * *